(12) United States Patent  (10) Patent No.: US 8,522,353 B1
Dunsbergen et al.  (45) Date of Patent: Aug. 27, 2013

(54) BLOCKING IEEE 802.11 WIRELESS ACCESS

(75) Inventors: Berend Dunsbergen, San Jose, CA (US); Vaduvur Bharghavan, Morgan Hill, CA (US)

(73) Assignee: Meru Networks, Sunnyvale, CA (US)

( * ) Notice: Subject to any disclaimer, the term of this patent is extended or adjusted under 35 U.S.C. 154(b) by 743 days.

(21) Appl. No.: 12/191,545

(22) Filed: Aug. 14, 2008

Related U.S. Application Data

(60) Provisional application No. 60/964,907, filed on Aug. 15, 2007.

(51) Int. Cl.
*H04L 29/06* (2006.01)

(52) U.S. Cl.
USPC .............................................. 726/26; 726/27

(58) Field of Classification Search
USPC .......................................... 726/26, 27; 455/1
See application file for complete search history.

(56) References Cited

U.S. PATENT DOCUMENTS

| | | | |
|---|---|---|---|
| 4,103,236 A * | 7/1978 | Deserno et al. .................... | 455/1 |
| 4,498,193 A * | 2/1985 | Richardson ........................ | 455/1 |
| 5,038,151 A | 8/1991 | Kaminski | |
| 5,337,397 A | 8/1994 | Lebby et al. | |
| 5,966,094 A | 10/1999 | Ward et al. | |
| 6,393,254 B1 * | 5/2002 | Pousada Carballo et al. .... | 455/1 |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,318,368 B2 * | 1/2008 | Ham et al. ..................... | 89/1.11 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,453,855 B1 | 11/2008 | Madhow | |
| 7,653,385 B2 * | 1/2010 | Arend et al. ............... | 455/422.1 |
| 2003/0123420 A1 * | 7/2003 | Sherlock ........................ | 370/338 |
| 2003/0135762 A1 * | 7/2003 | Macaulay ..................... | 713/201 |
| 2003/0198305 A1 | 10/2003 | Taylor et al. | |
| 2004/0203474 A1 * | 10/2004 | Miller et al. .................... | 455/69 |
| 2004/0242149 A1 * | 12/2004 | Luneau ............................ | 455/1 |
| 2005/0111405 A1 | 5/2005 | Kanterakis | |
| 2005/0152314 A1 | 7/2005 | Sun et al. | |
| 2006/0165078 A1 * | 7/2006 | Gopinath et al. ............. | 370/389 |

OTHER PUBLICATIONS

George Ou, How to Jam Your Neighbors Wi-Fi Legally, Jun. 15, 2006; Retrieved from http://www.zdnet.com/blog/ou/how-to-jam-your-neighbors-wi-fi-legally/247.*

Mika Stahlberg, Radio Jamming Attacks Against Two Popular Mobile Networks, Nov. 9, 2000, Retrieved from http://www.tml.tkk.fi/Opinnot/Tik-110.501/2000/papers/abstract_stahlberg.html.*

(Continued)

*Primary Examiner* — Chau Le
(74) *Attorney, Agent, or Firm* — Law Office of Dorian Cartwright

(57) ABSTRACT

One or more 802.11 access points that are programmed or otherwise configured to transmit a preferably continuous waveform over a band of frequencies that interferes with other devices in the region, effectively blocking all (or at least most) 802.11 traffic on channels spanned by that band of frequencies.

19 Claims, 4 Drawing Sheets

(56) References Cited

OTHER PUBLICATIONS

Brown et al., Jamming and Sensing of Encrypted Wireless Add Hoc Networks, May 2006, Retrieved from http://ecee.colorado.edu/~timxb/timxb/pubs/06jamming.pdf.*

Sampath et al., Multi-Channel Jamming Attacks using Cognitive Radios, Retrieved from http://ieeexplore.ieee.org/stamp/stamp.jsp?arnumber=04317844, Aug. 13, 2007, pp. 352-357.*

Habib et al. "Multi-antenna techniques for OFDM based WLAN." Proceedings of First International Conference on Next-Generation Wireless Systems, Jan. 2009, pp. 186-190.

* cited by examiner

```
TIME AND FREQ MAPPING
      CHANGE RAPIDLY
      BLOCK MULTIPLE BANDS
SWITCH BETWEEN PROVIDING SERVICE AND BLOCKING
      PRE-CONFIGURED
      CONFIGURABLE
      SPECIFIED, PROGRAMMED, OR PRE-DETERMINED TIMES
            MONTH, DAY, DATE, TIME OF DAY
            OTHER
      REAL-TIME BY ADMIN
WORK WITH OTHER BLOCKING ACCESS POINTS
CHARACTERISTICS OF INTERFERING SIGNAL(S)
      POWER LEVEL
            MAXIMUM
            FIXED
            VARIABLE
                  SPECIFIED, PROGRAMMED, OR PRE-DETERMINED TIMES
                        MONTH, DAY, DATE, TIME OF DAY
                        OTHER
                        REAL-TIME BY ADMIN
      DURATION AND CYCLING
            SHORT DURACTION, RAPID CYCLING
            4 MICROSECONDS ON, 20 MICROSECONDS OFF
            10 MICROSECONDS ON, 90 MICROSECONDS OFF
            OTHER
      FREQUENCIES
            2.4 GHZ BAND
                  COVER CHANNELS 1, 4, 7, 10, AND 13
                  COVER CHANNELS 1 AND 6 (40 MHZ SIGNALS)
                  COVER CHANNELS 6 AND 11 (40 MHZ SIGNALS)
                  COVER DIFFERENT CHANNELS
            5 GHZ BAND
                  COVER 12/13 CHANNELS (40 MHZ SIGNALS)
                  COVER DIFFERENT CHANNELS
            5.47 TO 5.725 GHZ BAND
                  COVER 13/14 FREQUENCIES
                  COVER 16 TO 20 FREQUENCIES (OVERLAP)
                  COVER DIFFERENT FREQUENCIES
```

Fig. 3

BLOCKING IEEE 802.11 WIRELESS ACCESS

CROSS REFERENCE TO RELATED APPLICATION

This application claims priority of U.S. Provisional Patent Application No. 60/964,907, filed Aug. 15, 2007 in the name of the same inventor, titled "Blocking IEEE 802.11 Wireless Access".

BACKGROUND OF THE INVENTION

1. Field of the Invention

This invention relates to blocking IEEE 802.11 wireless communication, for example to prevent all 802.11 access in a region.

2. Related Art

Businesses and other organizations often find it useful to provide IEEE 802.11 wireless access in a region or area. However, after hours, access points and the like sometimes become subject to unauthorized use or even hacking.

SUMMARY OF THE INVENTION

In view of the foregoing, it would be advantageous to be able to block all (or at least most) IEEE 802.11 wireless access in a given region when desired. This blocking preferably is performed by access points so that additional hardware does not need to be purchased and installed beyond that needed for active wireless access. As used in this application, the term "access point" refers to any direct sequence spread spectrum point-to-multipoint wireless communication device, preferably operating according to one or more of the IEEE 802.11x standards. Examples of access points include, but are not limited to, Meru Networks' AP150, AP200, AP300, OAP180, and RS4000 access points. APs made by other manufacturers also can be used.

The invention addresses these needs by programming or otherwise configuring one or more 802.11 access points to transmit a preferably continuous waveform over a band of frequencies that interferes with other devices in the region, effectively blocking all (or at least most) 802.11 traffic on channels spanned by that band of frequencies.

This brief summary has been provided so that the nature of the invention may be understood quickly. A more complete understanding of the invention may be obtained by reference to the following description of the preferred embodiments thereof in connection with the attached drawings.

BRIEF DESCRIPTION OF THE FIGURES

FIG. 3 shows various possible features of embodiments of the invention.

DESCRIPTION OF THE INVENTION

Briefly, all (or at least most) IEEE 802.11 wireless access in a given region can be blocked when desired. This blocking preferably is performed by access points so that additional hardware does not need to be purchased and installed beyond that needed for active wireless access. As used in this application, the term "access point" refers to any direct sequence spread spectrum point-to-multipoint wireless communication device, preferably operating according to one or more of the IEEE 802.11x standards. Examples of access points include, but are not limited to, Meru Networks' AP150, AP200, AP300, OAP180, and RS4000 access points. APs made by other manufacturers also can be used.

Figure 1:
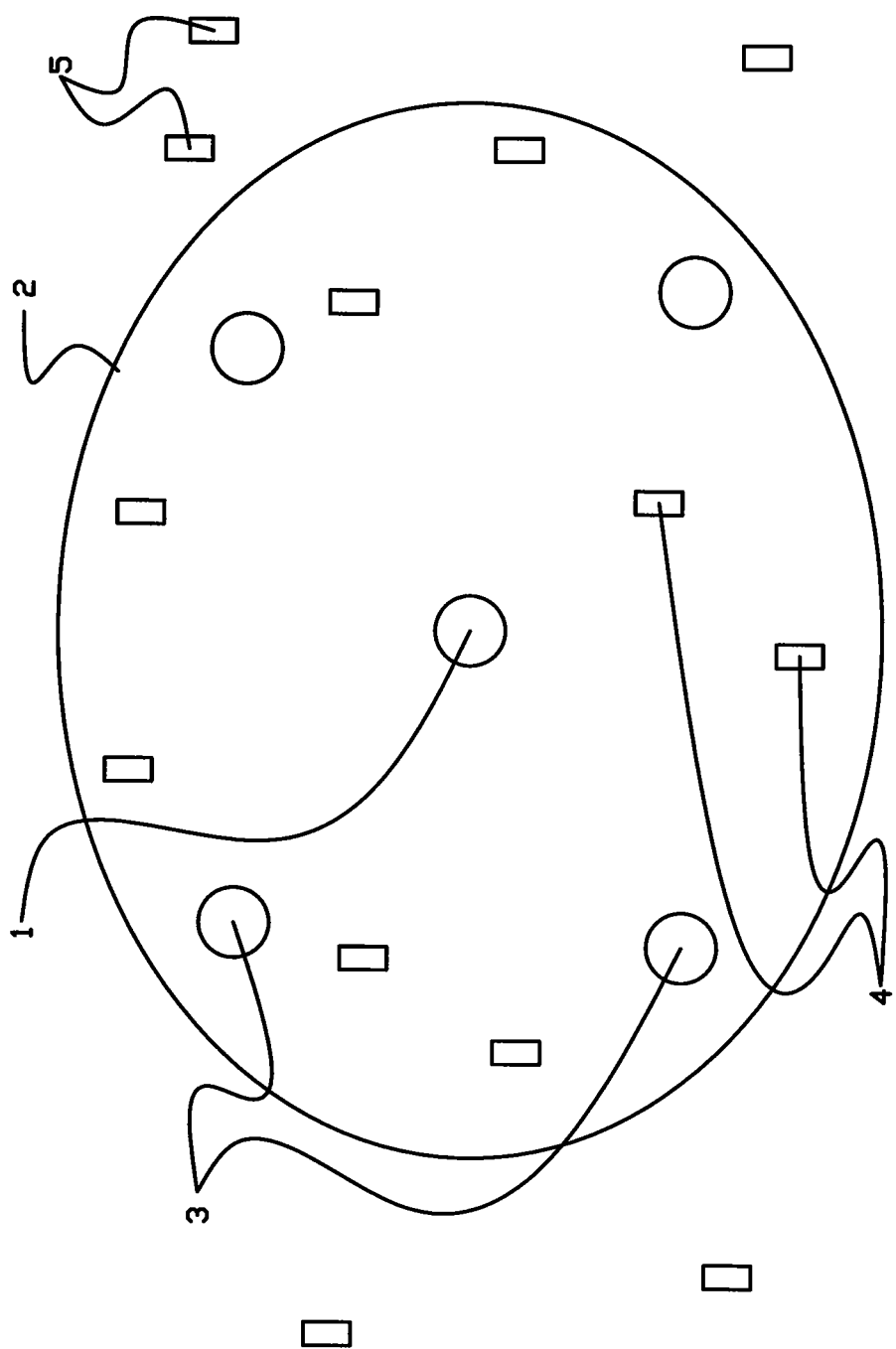
FIG. 1 shows an 802.11 access point blocking wireless access in a region.

One aspect of the invention is to program or otherwise configure one or more 802.11 access points to transmit a preferably continuous waveform over a band of frequencies that interferes with other devices in the region, effectively blocking all (or at least most) 802.11 traffic on channels spanned by that band of frequencies. Thus, FIG. 1 shows access point 1 programmed to block wireless activity in region 2. This blocking tends to prevent unauthorized use or even hacking of access points 3 in region 2 by devices 4 inside of region 2 and devices 5 outside of region 2. Devices 4 inside of region 2 most likely will also be blocked from 802.11 communication with any other access points and devices, while devices 5 outside of region 2 possibly still can communicate with other access points and devices outside of region 2. (Lead lines are not drawn to all of the access points and devices in FIG. 1 to prevent the figure from being too cluttered.)

In a preferred embodiment, a waveform is transmitted according to a time and frequency mapping that blocks a desired set of 802.11 channels. For example, the access point can change frequency rapidly in order to block 802.11-type traffic on multiple bands of frequencies in parallel.

Access points according to the invention preferably can switch between providing service and blocking service on certain times that have been configured or pre-configured by a system administrator or the like. Thus, blocking can occur at specified, programmed, or pre-determined times, for example based on month, day, date, or time of day. In addition, a system administrator or the like preferably can turn on and off blocking in real time as desired.

In more detail, a device (e.g., access point) needs to be in an interference range of a transmitter and an intended receiver of traffic in order to block that traffic effectively. To block all (or at least most) traffic in a region covered by multiple access points such as a building, business, campus, or the like, the multiple access points can be used in conjunction. Preferably, the blocking device(s) transmit at maximum power to cover as large an area as possible.

In an 802.11 framework, an interfering signal only needs to have a duration of a few microseconds to cause bit errors during reception of a frame. Using 802.11a, 802.11b, 802.11g and 802.11n, the theoretically shortest frame is about 24 microseconds. However, a typical frame is more than a hundred microseconds long. Moreover, for any meaningful traffic to occur, a sequence of at least 9 frames generally needs to succeed (auth-req, ack, auth-resp, ack, assoc-req, ack, assoc-resp, ack, data).

Thus, the interfering signal needs to be present for only a small percentage of the time to block 802.11 traffic. However, the cycle time needs to be relatively short. For example, a schedule of 4 microseconds on and 20 microseconds off would most likely block every single frame. A schedule of 10 on and 90 off may let an occasional frame through, but it would most likely make any meaningful 802.11 data transfer impossible.

The unlicensed spectrum in which 802.11 devices operate is split between the 2.4 GHz band and the 5 GHz band. The 2.4 GHz unlicensed spectrum is divided in 14 channels (1-14), each separated by 5 MHz. The frequency bandwidth of an 802.11 device is typically 20 MHz Therefore an interference signal on one channel can block traffic on neighboring channels.

Figure 2:
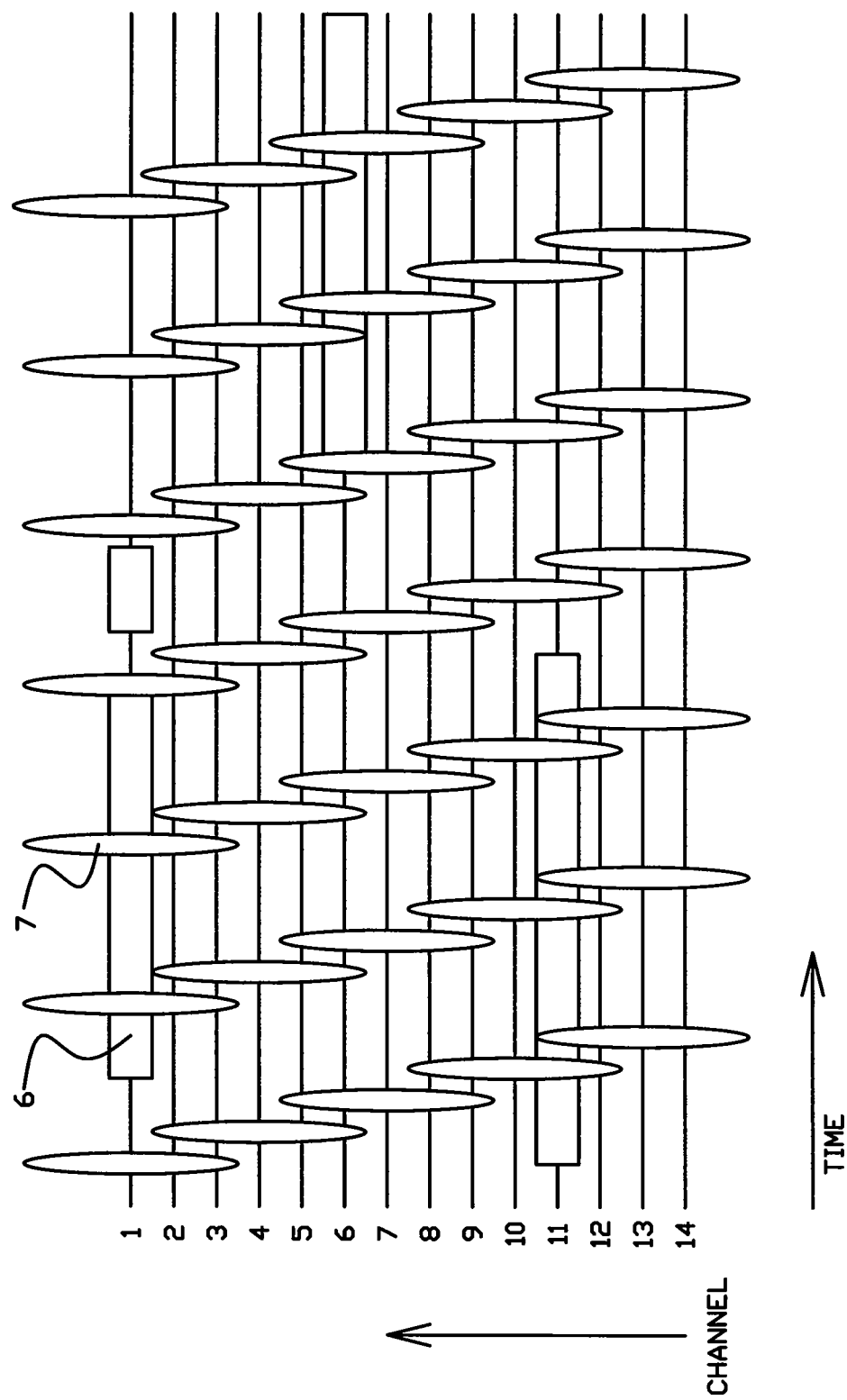
FIG. 2 shows blocking of the 2.4 GHz 802.11 band using five channels.

FIG. 2 shows how the complete 2.4 GHz band can be covered with transmitting interference signals on only 5 channels, here channels 1, 4, 7, 10, and 13. In this mapping, 802.11 traffic is illustrated by blocks such as block 6, and interference signals are represented by ovals such as oval 7. The invention is not limited to this mapping.

If an access point has a different bandwidth, a mapping of frequency vs. time different from that shown in FIG. 2 could be used.

Channels do not overlap on the 5 GHz band (IEEE 802.11a). This band typically has 12/13 channels (with part of the 12th channel designated for outdoor access point to access point configurations. Some countries permit this band to be expanded to a 5.47 to 5.725 GHz band (IEEE 802.11h), with around 24 channels. The useful bandwidth spanned by these channels is about 255 MHz. Thus, an access point or other transmitter with a 20 MHz bandwidth would preferably transmit over 13 or 14 different frequencies to interfere with all channels in these bands. Alternatively, if some overlap between blocking transmissions is desired, around 16 to 20 frequencies could be used. Again, the duration of transmission on each frequency would not have to be long to disrupt frames across multiple channels. Most existing 802.11a and 802.11h access points can be programmed or otherwise configured according to the invention with a suitable time/frequency mapping to cause such disruption, thereby blocking all (or at least most) useful communication over these bands. IEEE802.11n permits transmission over a 40 MHz bandwidth. Using this standard, blocking in the 2.4 GHz band can be accomplished with just 2 40 MHz signals, for example on channels 1 and 6 or 6 and 11. Blocking in the 5 GHz band can be accomplished using 13 40 MHz signals, for example spanning channels (36, 40), (44, 48), (52, 56) (60, 64), (100, 104), (108, 112), (116, 120), (124, 128), (132, 136), (140), (149, 153), (157, 161), and (165).

If a different level of blocking is desired, different signals, bandwidths, time frames, cycles, and durations can be used.

Furthermore, the strength of the signal used to block traffic can be controlled, thereby bounding the location or range of the blocking. Signal strength can be fixed or variable. Variable signal strength preferably can be configured or pre-configured by a system administrator or the like. Thus, blocking range can occur at specified, programmed, or pre-determined times, for example based on month, day, date, or time of day. In addition, a system administrator or the like preferably can modify the range (i.e., bounds of blocking) in real time as desired.

FIG. 3 shows many of the various features discussed above. Different embodiments of the invention may include a subset of these features and may also include additional features.

Advantageously, many existing access points that were not designed to block 802.11 traffic can be programmed or otherwise configured as described above to do so. Thus, 802.11 traffic often can be blocked according to a defined schedule without replacing existing access point hardware or adding new hardware. Alternatively, existing access points can be physically modified to perform such blocking, and new access points can be built to block 802.11 traffic in the above fashion.

Figure 4:
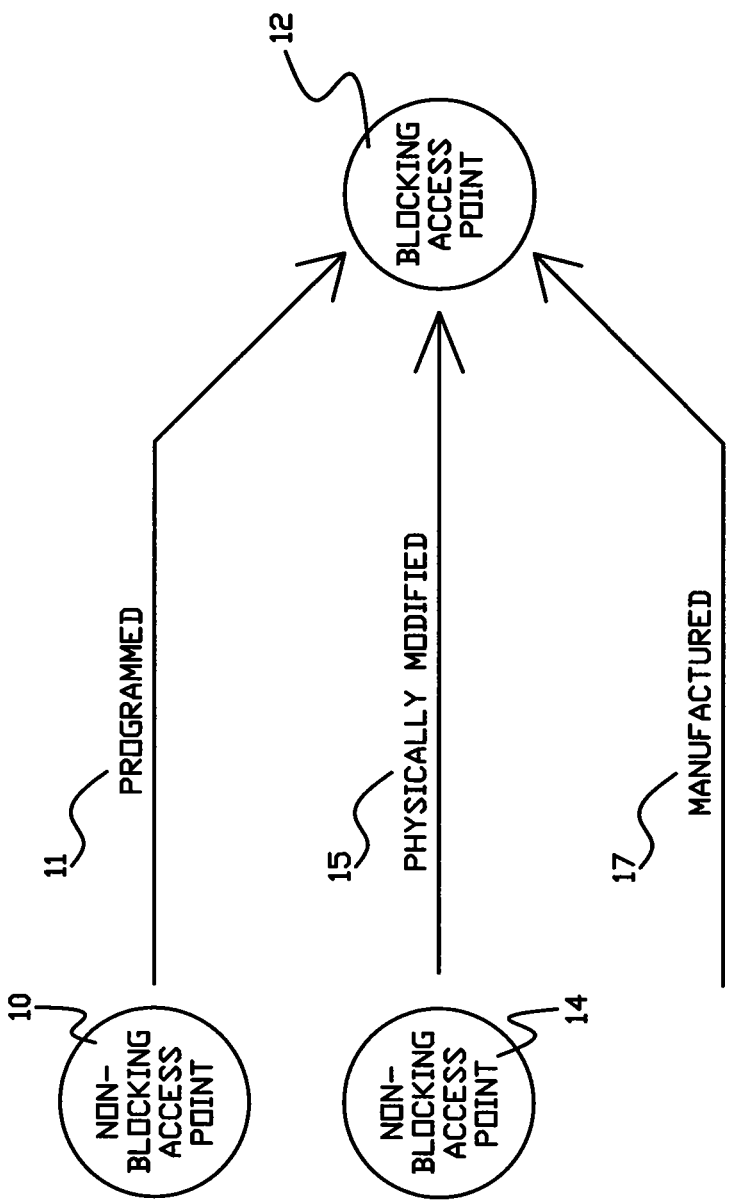
FIG. 4 shows some techniques for implementing embodiments of the invention.

FIG. 4 shows these techniques for implementing embodiments of the invention. Access point 10 is programmed 11 to achieve blocking access point 12. Alternatively, access point 14 is physically modified 15 to achieve blocking access point 12. Lastly, blocking access point 12 is manufactured 17 as a blocking access point. Other techniques can be used.

Generality of Invention

The invention can be embodied in a method for blocking 802.11 traffic, as well as in software and/or hardware such as access points that implements the method, and in various other embodiments.

Those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the techniques described herein using such equipment would not require undue experimentation or further invention.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

What is claimed is:

1. A method of disrupting IEEE (Institute of Electrical and Electronics Engineers) 802.11-type wireless network traffic with dual-mode access point, the method comprising:
connecting the dual-mode access point to a wireless network;
operating the dual-mode access point in a first mode to transmit and receive IEEE 802.11 network traffic over the wireless network for connected stations using an IEEE 802.11 radio;
responsive to a programmatic switch, operating the dual-mode access point in a second mode to disrupt IEEE 802.11 network traffic over an entire IEEE bandwidth that comprises a set of channels, wherein disrupting traffic comprises alternating between a subset of the set channels to transmit a plurality of interference signals with the IEEE 802.11 radio, each interference signal sent over a channel and affecting neighboring channels, and wherein operating in the second mode further comprises alternating between the subset of channels with a frequency that overlaps at least a portion of each frame sequence and at least one data frame; and responsive to a subsequent programmatic switch, returning the dual-mode access point to operate in the first mode.

2. The method of claim 1,
wherein the frame sequence comprises an auth-req frame and ack frame, an auth-resp frame and ack frame, an assoc-req frame and ack frame, and an assoc-resp frame and ack frame.

3. The method of claim 1, wherein the IEEE 802.11 network traffic occurs on a 2.4 GHz band comprising approximately 14 channels separated by approximately 5 MHz, and wherein the IEEE 802.11 radio transmits interference signals at approximately a 20 MHz bandwidth.

4. The method of claim 1, wherein at least a portion of the IEEE 802.11 network traffic occurs on a 2.4 GHz band comprising approximately 14 channels separated by approximately 5 MHz, and wherein the IEEE 802.11 radio comprises an IEEE 802.11n radio that transmits interference signals at approximately a 40 MHz bandwidth.

5. The method of claim 1, wherein further comprising:
initially operating according to only the first mode; and
updating program code of the access point to allow operation in the second mode.

6. The method of claim 1, operating in the second mode comprises:
responsive to the programmatic switch, operating in the second mode, wherein the programmatic switch is configured according to pre-determined times.

7. The method of claim 1, wherein operating in the second mode further comprises:
responsive to the programmatic switch, operating in the second mode, wherein disrupting traffic comprises transmitting on a channel between approximately 4 microseconds and returning to transmit on the channel within approximately 20 microseconds.

8. The method of claim 1, wherein the network traffic is substantially blocked over the 2.4 Ghz band by transmitting interference signals on only a subset of two channels.

9. The method of claim 1, wherein interference signals are transmitted to block traffic over multiple bands of frequency substantially in parallel.

10. A non-transitory computer readable medium storing a computer program product to perform a method for disrupting IEEE (Institute of Electrical and Electronics Engineers) 802.11-type wireless network traffic with dual-mode access point, the method comprising:
connecting the dual-mode access point to a wireless network;
operating the dual-mode access point in a first mode to transmit and receive IEEE 802.11 network traffic over the wireless network for connected stations using an IEEE 802.11 radio;
responsive to a programmatic switch, operating the dual-mode access point in a second mode to disrupt IEEE 802.11 network traffic over an entire IEEE bandwidth that comprises a set of channels, wherein disrupting traffic comprises alternating between a subset of the set channels to transmit a plurality of interference signals with the IEEE 802.11 radio, each interference signal sent over a channel and affecting neighboring channels, and wherein operating in the second mode further comprises alternating between the subset of channels with a frequency that overlaps at least a portion of each frame sequence and at least one data frame; and
responsive to a subsequent programmatic switch, returning the dual-mode access point to operate in the first mode.

11. The method of claim 10,
wherein the frame sequence comprises an auth-req frame and ack frame, an auth-resp frame and ack frame, an assoc-req frame and ack frame, and an assoc-resp frame and ack frame.

12. The method of claim 10, wherein the IEEE 802.11 network traffic occurs on a 2.4 GHz band comprising approximately 14 channels separated by approximately 5 MHz, and wherein the IEEE 802.11 radio transmits interference signals at approximately a 20 MHz bandwidth.

13. The method of claim 10, wherein at least a portion of the IEEE 802.11 network traffic occurs on a 2.4 GHz band comprising approximately 14 channels separated by approximately 5 MHz, and wherein the IEEE 802.11 radio comprises an IEEE 802.11n radio that transmits interference signals at approximately a 40 MHz bandwidth.

14. The method of claim 10, wherein further comprising:
initially operating according to only the first mode; and
updating program code of the access point to allow operation in the second mode.

15. The method of claim 10, operating in the second mode comprises:
responsive to the programmatic switch, operating in the second mode, wherein the programmatic switch is configured according to pre-determined times.

16. The method of claim 10, wherein operating in the second mode further comprises:
responsive to the programmatic switch, operating in the second mode, wherein disrupting traffic comprises transmitting on a channel between approximately 4 microseconds and returning to transmit on the channel within approximately 20 microseconds.

17. An access point to disrupt (Institute of Electrical and Electronics Engineers) 802.11-type wireless network traffic with dual-mode access point, the access point comprising:
an IEEE 802.11 radio, comprising a processor, to connect to a wireless network and operate in a first mode to transmit and receive IEEE 802.11 network traffic over the wireless network for connected stations; and
a programmatic switch to change the IEEE.802.11 radio from the first mode to a second mode,
wherein responsive to the programmatic switch, the IEEE 802.11 radio changes to the second mode to disrupt IEEE 802.11 network traffic over an entire IEEE bandwidth that comprises a set of channels, wherein disrupting traffic comprises alternating between a subset of the set channels to transmit a plurality of interference signals with the IEEE 802.11 radio, each interference signal sent over a channel and affecting neighboring channels, wherein operating in the second mode further comprises alternating between the subset of channels with a frequency that overlaps at least a portion of each frame sequence and at least one data frame, and
wherein responsive to the programmatic switch, returning the IEEE 802.11 to operate in a first mode.

18. The method of claim 17,
wherein the frame sequence comprises an auth-req frame and ack frame, an auth-resp frame and ack frame, an assoc-req frame and ack frame, and an assoc-resp frame and ack frame.

19. The method of claim 17, wherein the IEEE 802.11 network traffic occurs on a 2.4 GHz band comprising approximately 14 channels separated by approximately 5 MHz, and wherein the IEEE 802.11 radio transmits interference signals at approximately 20 MHz.

* * * * *